(12) United States Patent
Schmidt

(10) Patent No.: US 9,450,784 B2
(45) Date of Patent: Sep. 20, 2016

(54) COMMUNICATING DATA AMONG PERSONAL CLOUDS

(71) Applicant: BlackBerry Limited, Waterloo (CA)

(72) Inventor: David Schmidt, Cambridge (CA)

(73) Assignee: BlackBerry Limited, Waterloo, Ontario (CA)

( * ) Notice: Subject to any disclaimer, the term of this patent is extended or adjusted under 35 U.S.C. 154(b) by 598 days.

(21) Appl. No.: 13/628,527

(22) Filed: Sep. 27, 2012

(65) Prior Publication Data

US 2014/0089526 A1 Mar. 27, 2014

(51) Int. Cl.
*H04L 12/64* (2006.01)

(52) U.S. Cl.
CPC .................. *H04L 12/6418* (2013.01)

(58) Field of Classification Search
CPC .................. H04L 41/00; H04L 12/6418
USPC .................. 709/249; 707/630, 783
See application file for complete search history.

(56) References Cited

U.S. PATENT DOCUMENTS

| | | | | |
|---|---|---|---|---|
| 8,296,793 | B2* | 10/2012 | Johnson | 725/34 |
| 9,300,717 | B2* | 3/2016 | Li | H04W 4/12 |
| 2008/0091763 | A1* | 4/2008 | Devonshire | G06F 9/548 709/201 |
| 2011/0047463 | A1* | 2/2011 | Shepherd | G06Q 10/10 715/723 |
| 2011/0083167 | A1* | 4/2011 | Carpenter | G06F 17/30563 726/4 |
| 2011/0137991 | A1* | 6/2011 | Russell | 709/204 |
| 2011/0138048 | A1* | 6/2011 | Dawson | G06F 9/4856 709/226 |
| 2011/0138050 | A1* | 6/2011 | Dawson | G06F 9/5072 709/226 |
| 2011/0231796 | A1* | 9/2011 | Vigil | G06F 3/04883 715/810 |
| 2011/0246765 | A1* | 10/2011 | Schibuk | 713/158 |
| 2011/0258303 | A1* | 10/2011 | Nath et al. | 709/223 |
| 2012/0011190 | A1* | 1/2012 | Driesen | G06Q 10/06 709/202 |
| 2012/0072723 | A1* | 3/2012 | Orsini | G06F 21/6209 713/165 |
| 2012/0084348 | A1* | 4/2012 | Lee et al. | 709/203 |
| 2012/0084349 | A1* | 4/2012 | Lee | G06Q 30/02 709/203 |
| 2012/0136936 | A1* | 5/2012 | Quintuna | 709/204 |
| 2012/0151057 | A1* | 6/2012 | Paredes | H04L 12/4641 709/225 |
| 2012/0233668 | A1* | 9/2012 | Leafe | G06F 9/5022 726/4 |
| 2012/0265803 | A1* | 10/2012 | Ha et al. | 709/203 |
| 2012/0324011 | A1* | 12/2012 | Shepherd et al. | 709/204 |
| 2013/0031136 | A1* | 1/2013 | Shah | 707/783 |
| 2013/0046982 | A1* | 2/2013 | Suh et al. | 713/171 |

(Continued)

OTHER PUBLICATIONS

Juric, "Flexible Replication for Personal Clouds", 2010.*

(Continued)

*Primary Examiner* — O.S. Vostal

(74) *Attorney, Agent, or Firm* — Fish & Richardson P.C.

(57) ABSTRACT

A gateway device performs authentication with an interconnect system that coordinates communication of data among a plurality of personal clouds. The gateway device is part of a first personal cloud that includes electronic devices. Data is communicated between the first personal cloud and at least a second personal cloud based on information in the interconnect system, wherein the communication is performed according to at least one rule provided at the gateway device, wherein the at least one rule includes at least one criterion relating to data to be shared among the plurality of personal clouds.

19 Claims, 5 Drawing Sheets

(56) References Cited

U.S. PATENT DOCUMENTS

| | | | |
|---|---|---|---|
| 2013/0054634 A1* | 2/2013 | Chakraborty et al. | 707/769 |
| 2013/0073724 A1* | 3/2013 | Parashar | G06F 9/5072 709/224 |
| 2013/0075380 A1* | 3/2013 | Albrech | B23K 9/1006 219/137 R |
| 2013/0132948 A1* | 5/2013 | Hari et al. | 718/1 |
| 2013/0159392 A1* | 6/2013 | Huh et al. | 709/203 |
| 2013/0173499 A1* | 7/2013 | Cannon | G06Q 30/02 705/400 |
| 2013/0185336 A1* | 7/2013 | Singh et al. | 707/794 |
| 2013/0212129 A1* | 8/2013 | Lawson et al. | 707/779 |
| 2013/0212160 A1* | 8/2013 | Lawson et al. | 709/203 |
| 2013/0247034 A1* | 9/2013 | Messerli | G06F 9/45533 718/1 |
| 2013/0268357 A1* | 10/2013 | Heath | 705/14.53 |
| 2013/0290274 A1* | 10/2013 | Patil et al. | 707/690 |
| 2013/0311411 A1* | 11/2013 | Senanayake et al. | 706/13 |
| 2013/0311925 A1* | 11/2013 | Denker et al. | 715/771 |
| 2013/0346494 A1* | 12/2013 | Nakfour et al. | 709/204 |
| 2013/0347072 A1* | 12/2013 | Dinha | H04L 63/0272 726/4 |
| 2014/0025799 A1* | 1/2014 | Azizi et al. | 709/223 |
| 2014/0047099 A1* | 2/2014 | Flores | H04L 41/22 709/224 |
| 2014/0056178 A1* | 2/2014 | Tsai | H04L 49/65 370/256 |
| 2014/0059226 A1* | 2/2014 | Messerli | G06F 9/5072 709/226 |
| 2014/0075319 A1* | 3/2014 | Kuo | G06F 9/5055 715/736 |

OTHER PUBLICATIONS

Wu et al., "Composable IO: a novel resource sharing platform in personal Clouds", 2011.*

Sridhar, "Cloud Computing—A Primer Part 2: Infrastructure and Implementation Topics", 2009.*

Diaz-Sanchez et al., "A Privacy Aware Media Gateway for Connecting Private Multimedia Clouds to Limited Devices", 2011.*

Li et al., "Efficient Keyword Search over Encrypted Data with Fine-Grained Access Control in Hyrid Cloud", 2012.*

Sadasivan et al., "A Survey on Access Control of Cloud Data", 2012.*

Sempolinski et al., "A Comparison and Critique of Eucalyptus, OpenNebula and Nimbus", 2010.*

Lin, "Survey on Cloud Based Mobile Security and a New Framework for Improvement", 2011.*

Wikipedia, Hamachi (software) dated May 25, 2012 (5 pages).

Eric Knorr, www.infoworld.com, Does the 'private cloud' make sense? Jun. 6, 2012 (3 pages).

searchcloudcomputing.com, private cloud (internal cloud or corporate cloud), Jun. 11, 2009 (1 page).

www.remobo.com—Create an Instant Private Network, FAQ dated on or before Jun. 5, 2012 (5 pages).

www.remobo.com—Create an Instant Private Network—Create Your Own Private Network Across the Internet dated on or before Jun. 5, 2012 (3 pages).

* cited by examiner

COMMUNICATING DATA AMONG PERSONAL CLOUDS

TECHNICAL FIELD

The present disclosure relates generally to communicating data, including but not limited to communicating data among electronic devices in a cloud environment.

BACKGROUND

A user may be associated with multiple different electronic devices. The multiple electronic devices of a user may be considered to be part of a personal cloud of the user.

DETAILED DESCRIPTION

Figure 1:
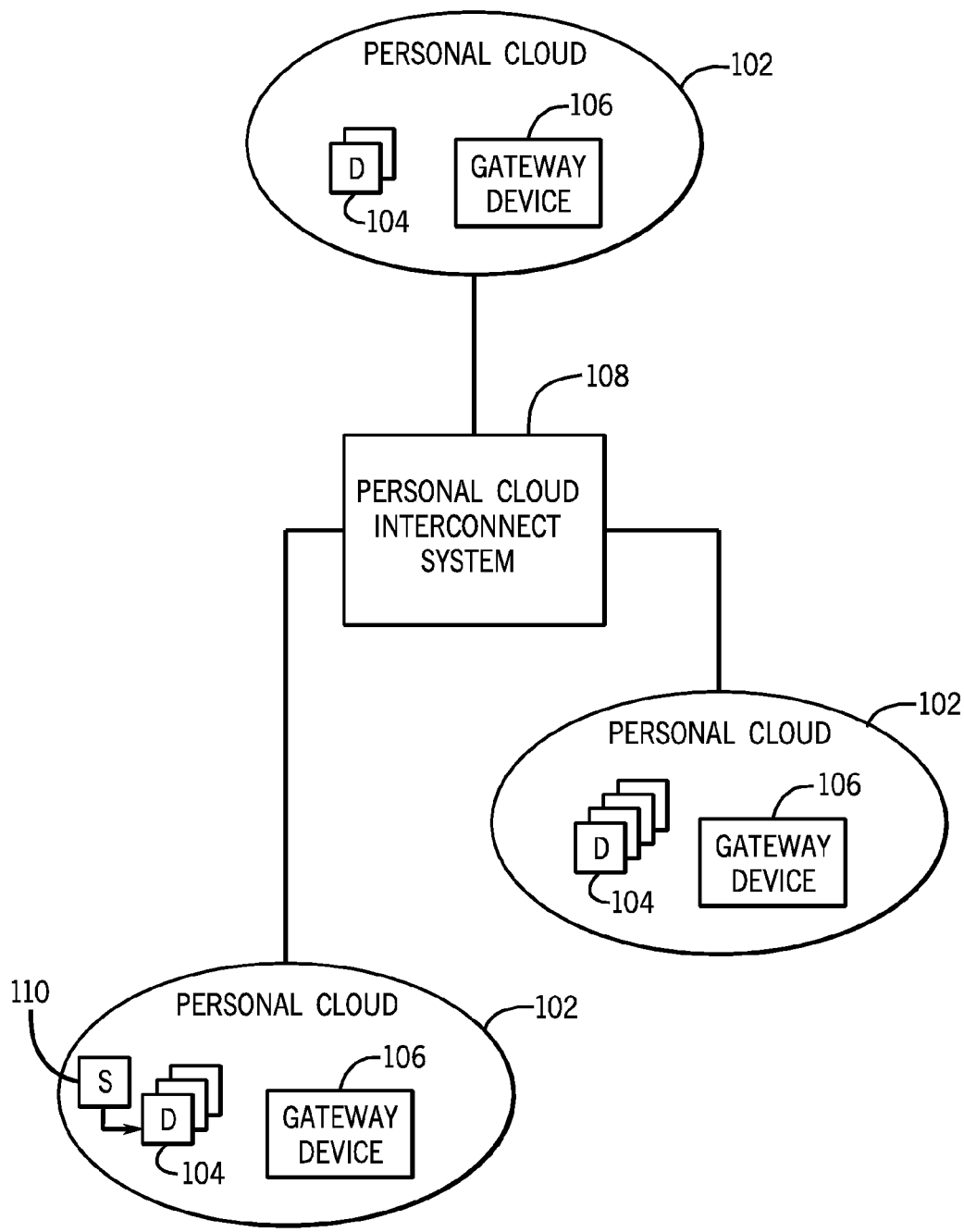
FIG. 1 is a block diagram of an example arrangement that includes personal clouds that are interconnected by a personal cloud interconnect system in accordance with the disclosure.

A user may utilize any of multiple electronic devices associated with the user's personal cloud to perform communications and other tasks. Examples of electronic devices include a desktop computer, notebook computer, tablet computer, personal digital assistant, smartphone, mobile internet device, electronic navigation device, organizer, handheld electronic game, digital photograph album, digital camera, media player, e-book reader, and so forth. Collectively, the multiple electronic devices that are associated with a user may be referred to as a personal cloud. A peer relationship may be formed among two or more of the electronic devices in the personal cloud. The peer relationship may include, for example, a peer-to-peer networking protocol, a common user profile, synchronized user credentials, a personal cloud identification configuration, or other methods that allow for the electronic devices to form a personal cloud associated with a user.

In a personal cloud, an electronic device may receive or create respective data, which may be shared among the electronic devices within the personal cloud. Data among the electronic devices of the personal cloud may be synchronized with respect to each other such that each electronic device maintains a copy of the synchronized data. Such synchronization is referred to as symmetric replication of data among the electronic devices of the personal cloud. Asymmetric replication may be performed, wherein one of the electronic devices acts as a data server for the remaining electronic devices of the personal cloud. The data server contains a copy of all data associated with the personal cloud. As yet another example, data is not replicated among the electronic devices of the personal cloud; nevertheless, data located at each electronic device in the personal cloud is accessible or shared by another electronic device in the personal cloud. As discussed further below, another variation involves zero replication of data in a personal cloud.

Users may use electronic devices to exchange data with each other for various purposes. For example, users may exchange data as part of social networking. Users may exchange data in other contexts, such as in the context of submitting reviews of products, hotels, airlines, and so forth. In the latter examples, users may access third party websites to which reviews and other data, e.g., pictures, videos, and so forth, may be uploaded for sharing.

Traditional social networking sites or product/service review sites, such as sites provided by Facebook, Twitter, Tripadvisor, and so forth, employ a centralized communication topology wherein users log into a central site, e.g., a website, to submit data for sharing, e.g., by typing a message, uploading files such as image files, video files, and so forth. The data submitted by a user may be shared with specific identified users, such as on-line friends of the user, followers of the user, users who share common interests with the user, and so forth.

Instead of a centralized communication topology utilized by traditional data sharing sites, a decentralized communication topology may be used instead, in which data located at various personal clouds may be shared with other personal clouds based on predefined sharing rules that control sharing of data. The personal clouds associated with different users may be considered basic building blocks from which data may be served for sharing with other personal clouds. Agents may be deployed in the personal clouds to control the sharing of data among personal clouds according to the predefined sharing rules.

The predefined sharing rules reflect relationships among different users. For example, in the social networking context, the relationships may include online friends, followers, and so forth. In the review site context, the relationships may include users who share an interest in a particular item, such as a specific product, a specific hotel, a specific airline, and so forth. The predefined sharing rules also specify the permissions that govern the sharing of data among the users.

FIG. 1 depicts an example arrangement that includes various personal clouds 102. A personal cloud includes a number of electronic devices 104. A personal cloud further includes a gateway device 106, which may be one of the electronic devices of the corresponding personal cloud, or may be a device that is separate from the electronic devices.

A personal cloud interconnect system 108 is provided that includes infrastructure that supports communication among the personal clouds 102. The personal cloud interconnect system 108 may be implemented with a computing system or a collection of computing systems, which may be provided at one or multiple geographic locations.

The personal cloud interconnect system 108 performs authentication and routing tasks, but may not actually create or persistently store data that is to be shared among users. In contrast, centralized data sharing services generate data or upload data to a central site, before the data may be shared among users. The personal cloud interconnect system 108 may pass user data between personal clouds, but does not process the data that is communicated, for example, in a payload of data packets routed through the personal cloud interconnect system 108. For example, the personal cloud interconnect system 108 does not decode, interpret, or otherwise convert the data. The personal cloud interconnect system 108 may be unable to process the data for security and privacy reasons. Because the personal cloud interconnect system 108 does not process the communicated data that pass through the personal cloud interconnect system 108, the personal cloud interconnect system 108 is unable to perform data mining of user data for various purposes, which enhances user privacy. Because shared data is served from personal clouds, advertising may be eliminated or reduced in user interfaces utilized to view and share data.

The personal cloud interconnect system 108 may actually also store user data from a particular personal cloud that is to be shared with other personal cloud(s). The storage space of the personal cloud interconnect system 108 that is provided to store user data from the particular personal cloud may be considered to also be part of the particular personal cloud. The storage space of the personal cloud interconnect system 108 may be implemented with storage device(s) in the personal cloud interconnect system 108, or with storage device(s) accessible by the personal cloud interconnect system 108.

In the distributed arrangement of FIG. 1, sharing of data among personal clouds 102 is controlled by agents in respective gateway devices 106. In this manner, storage and control of data remains with devices associated with respective users.

A personal cloud may also include a sensor that is separate from the electronic devices of the user. The sensor is able to measure certain information, and to communicate the measurement information to an aggregator device for further communication to another destination. FIG. 1 depicts an example sensor 110, which may measure information and communicate the measured information to an electronic device 104, or alternatively to the gateway device 106, to facilitate communication of the measured information to another device. For example, the sensor 110 may be a heart rate monitor, which may collect heart rate information of a user to communicate with a personal cloud of the user's physician. The measured information from the smart sensor 110 may be communicated to another personal cloud through the gateway device 106. Although one sensor 110 is depicted in FIG. 1, additional sensors may be provided in one or more personal clouds 102.

Figure 2:
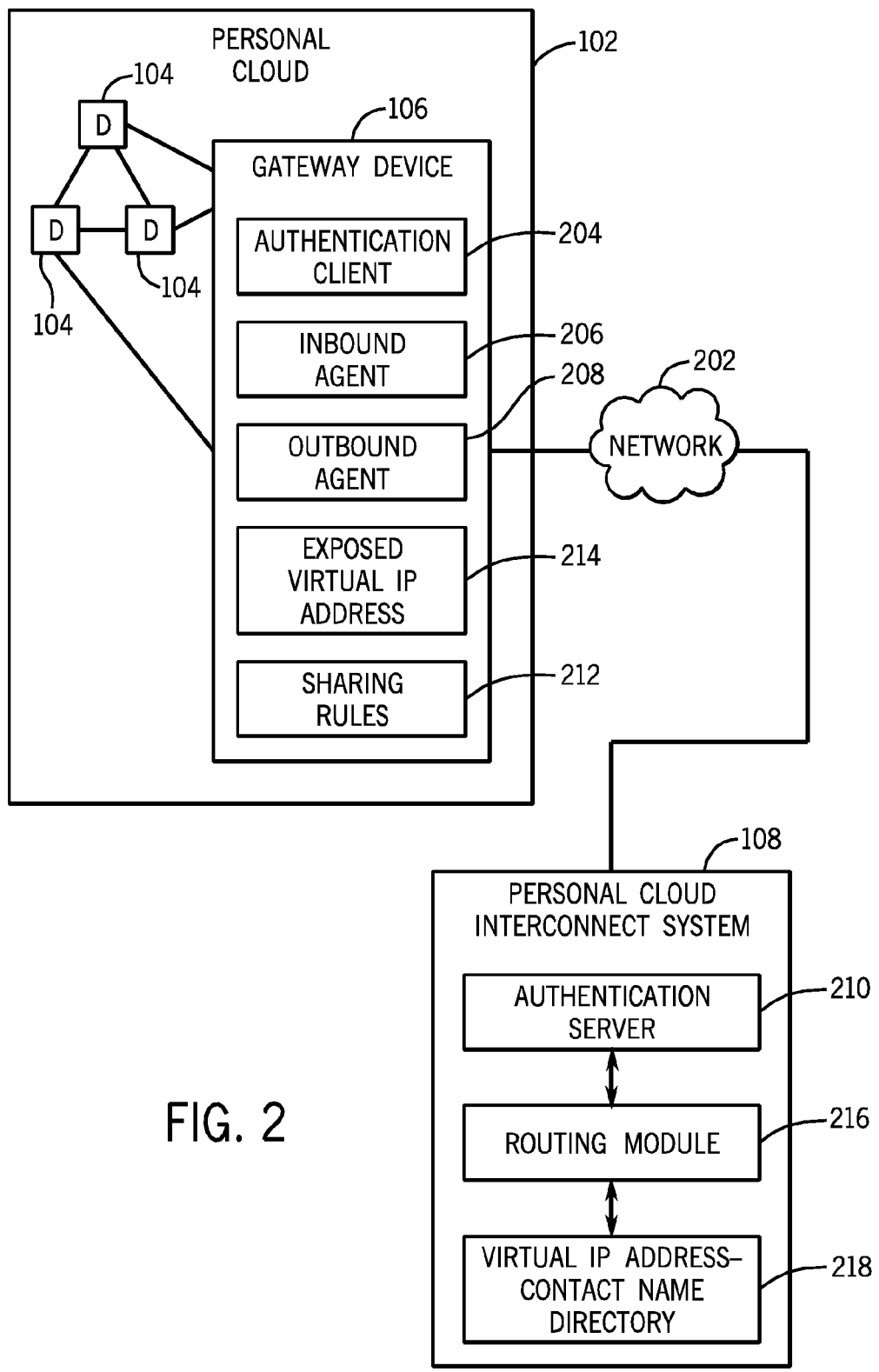
FIG. 2 is a block diagram of a personal cloud and a personal cloud interconnect system in accordance with the disclosure.

FIG. 2 depicts components of a personal cloud 102, and components of the personal cloud interconnect system 108. In the example of FIG. 2, several personal cloud devices are depicted in the personal cloud 102. Any suitable number of personal cloud devices may operate within the personal cloud 102.

The personal cloud devices in the personal cloud 102 may include electronic devices 104 and a gateway device 106. The gateway device 106 may actually be an electronic device that also includes functionalities of the gateway device 106 as discussed below.

The personal cloud devices 104 and 106 may be interconnected in a mesh arrangement such that each personal cloud device is interconnected to each other personal cloud device. Different interconnect arrangements may be employed, wherein at least one of the personal cloud devices 104, 106 may be interconnected to another personal cloud device through an intermediate personal cloud device. The personal cloud devices 104 and 106 may communicate with each other in a peer-to-peer fashion, such as via a peer relationship as described previously.

Communications by personal cloud devices in the personal cloud 102 with an external network, including network 202, occur through the gateway device 106. In the example of FIG. 2, the gateway device 106 includes an authentication client 204, an inbound agent 206, and an outbound agent 208. The authentication client 204 is to perform an authentication procedure with an authentication server 210 that is part of the personal cloud interconnect system 108. To perform authentication, the authentication client 204 submits a user credential to the authentication server 210, which may authenticate the user. The authentication procedure is performed to ensure that users that are attempting to access the data sharing services of the distributed arrangement may be trusted and are authorized to access such services. The authentication functionality offered by the authentication server 210 allows users who desire to share data with each other peace of mind in knowing that each of the users has been authenticated by the personal cloud interconnect system 108.

The inbound agent 206 of the gateway device 106 may actively access remote personal clouds through the personal cloud interconnect service 108 to identify data of interest that the inbound agent 206 may pull from a remote personal cloud. Additionally, the inbound agent 206 may receive incoming pushed data from a remote personal cloud. The inbound agent 206 may operate according to sharing rules 212, which are either stored in the gateway device 106 or are accessible by the gateway device 106. The sharing rules 212 specify criteria associated with sharing of data in two different directions, including a first direction in which data is provided from the personal cloud 102 to another personal cloud, and a second direction in which data is provided from another personal cloud to the personal cloud 102. Thus, when the inbound agent 206 crawls for data of remote personal clouds, the inbound agent 206 may utilize one or more criteria in the sharing rules 212 to determine what types of data to retrieve, time intervals during which data is to be pulled, and so forth. Similarly, when a push attempt is made from a remote personal cloud to push data to the personal cloud 102, the one or more criteria of the sharing rules 212 may be utilized to determine whether the push attempt is to be allowed or denied.

The outbound agent 208 in the gateway device 106 may push data from the personal cloud 102 to a remote personal cloud, according to one or more criteria of the sharing rules 212. Additionally, the outbound agent 208 may determine whether or not pull requests from a remote personal cloud is to be permitted or refused, according to one or more criteria of the sharing rules 212.

The gateway device 106 exposes an identifier to the personal cloud interconnect system 108 that may be utilized by the personal cloud interconnect system 108 to communicate with the personal cloud 102. In specific examples, the exposed identifier may include a virtual Internet Protocol (IP) address 214. A virtual IP address is an IP address within a predefined IP address space that may be utilized by the personal cloud interconnect system 108 to route data packets among the personal clouds. The virtual IP addresses within the predefined IP address space may be utilized for traditional routing over an IP network. Alternatively, the virtual IP address may be an IP address allocated from a non-routable reserved address space. The virtual IP address may represent the personal cloud as a single IP address even though the various electronic devices of the personal cloud have separate and distinct IP addresses.

Instead of utilizing virtual IP addresses to perform routing of data units, other types of identifiers may be employed, including real IP addresses, other types of network addresses, or other identifiers.

The personal cloud interconnect system 108 includes a routing module 216 that is able to route data packets among personal clouds. The routing module 216 is able to access a virtual IP address-contact name directory 218, which maps contact names to respective virtual IP addresses. A "contact name" may refer to any name or label that may be assigned to a user. The gateway device 106 in the personal cloud 102 may send data packets to a specific contact name (name of a target user, for example). The routing module 216 in the personal cloud interconnect system 108 may utilize the virtual IP address-contact name directory 218 to map the contact name to a corresponding virtual IP address. This mapped virtual IP address may be utilized by the routing module 216 to route the data packet to the destination personal cloud.

Instead of routing data packets to contact names, the gateway device 106 may include the destination virtual IP address or real IP address in the data packet, which may be utilized by the routing module 216 to route the data packet to a destination personal cloud. Although reference is made to routing a data packet to a destination personal cloud, a data packet may be routed to multiple destination personal clouds.

The routing module 216 supports secure tunneling of data among personal clouds over the network 202, which may be an un-secured network such as the Internet. Tunneling data through a network refers to communicating the data in a communication session that is protected by some privacy control. For example, the tunneled data may be encrypted. Virtual private networks (VPNs) may be created between gateway devices of personal clouds to allow data to be securely communicated, such as utilizing peer-to-peer technology, among the personal clouds through the VPNs.

Data between personal clouds may be passed through the personal cloud interconnect system 108. Alternatively, data between personal clouds is not passed through the personal cloud interconnect system 108. In the latter examples, the personal cloud interconnect system 108 may direct a source personal cloud to one or more destination personal clouds, such as by providing routing information, for example, IP address or addresses, to the source personal cloud. More generally, the routing of data between personal clouds by the personal cloud interconnect system 108 may include communicating the data through the personal cloud interconnect system 108 from a source personal cloud to destination personal cloud(s). Alternatively, the routing of data between personal clouds by the personal cloud interconnect system 108 may include the personal cloud interconnect system 108 directing the source personal cloud to the destination personal cloud(s), such that data may be communicated between the personal clouds but the data does not pass through the personal cloud interconnect system 108. The communication of data between personal clouds may be over a link between gateway devices 106 of the corresponding personal clouds. Examples of the transport link may include a Bluetooth link, a WiFi link, or other type of link. In such a latter arrangement, the personal cloud interconnect system 108 may provide control functions for directing the personal clouds to communicate, but the data does not pass through the personal cloud interconnect system 108.

Figure 3:
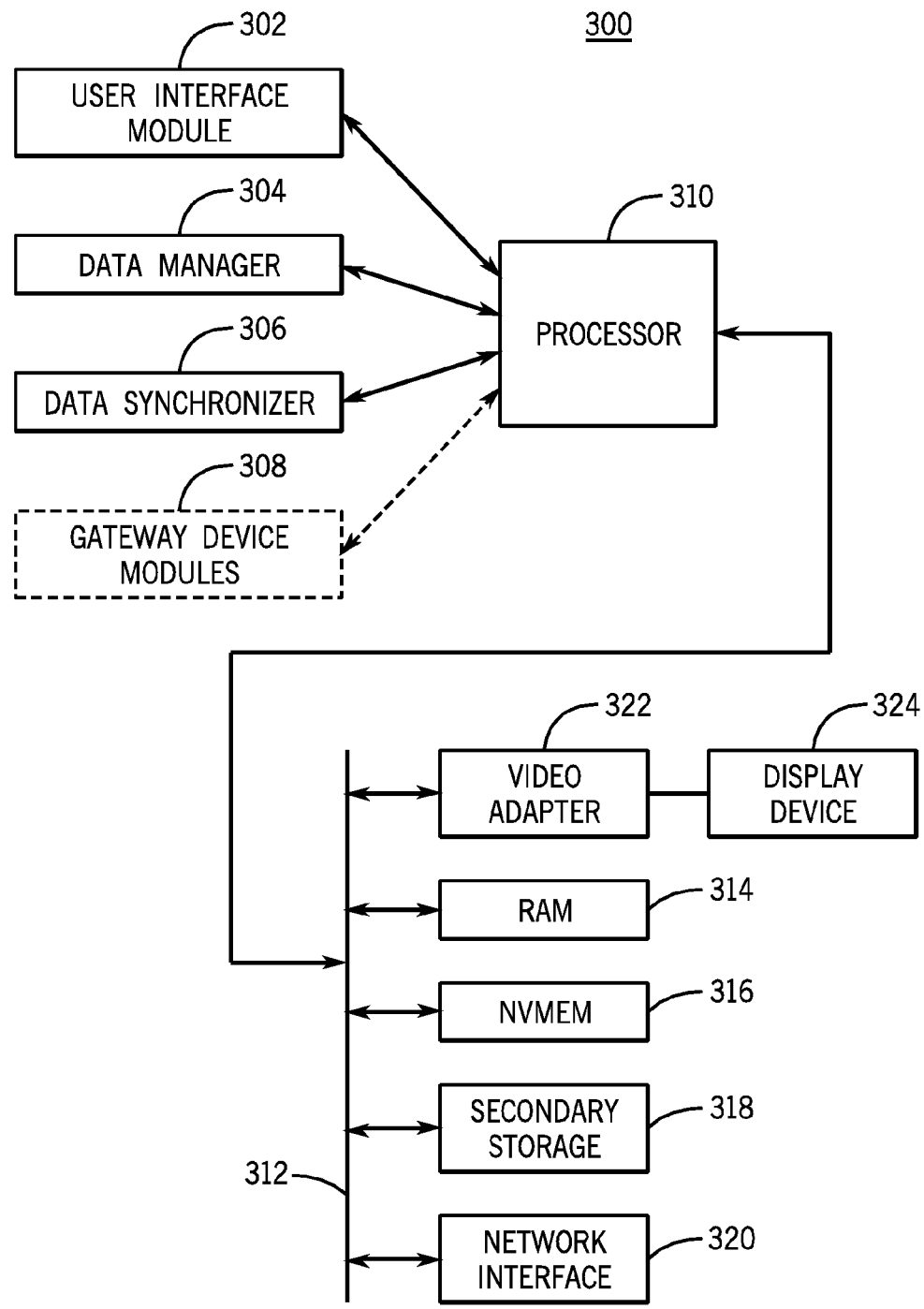
FIG. 3 is a block diagram of a personal cloud device in accordance with the disclosure.

FIG. 3 is a block diagram of an example personal cloud device 300. The personal cloud device 300 may be an electronic device 104 or a gateway device 106. The gateway device 106 may be an electronic device configured with the modules of the gateway device 106 described in FIG. 2. The gateway device 106 may act as a server device without any user device capabilities.

The personal cloud device 300 includes a user interface module 302, which may provide a user interface, including a graphical user interface, to allow for a user of the personal cloud device 300 to view data that belongs to the user or data shared from another device, such as data communicated from another device either in the same personal cloud of the user or from a remote personal cloud associated with another user. The user interface provided by the user interface module 302 may also be utilized to input, select, modify, and so forth, sharing rules, such as the sharing rules 212 of FIG. 2.

The personal cloud device 300 also includes a data manager 304, which is utilized to manage the storage and access of data at the personal cloud device 300. The data manager 304 may manage the storage of data belonging to the user of the personal cloud device 300. The data manager 304 may also manage the storage of data received from another device.

The personal cloud device 300 may include a data synchronizer 306, which is able to synchronize data of the personal cloud device 300 with another personal cloud device of the personal cloud 102 in which the personal cloud device 300 is part of. The data synchronizer 306 may perform symmetric replication of data among the personal cloud devices of a personal cloud 102. Symmetric replication refers to replication of data wherein each of the personal cloud devices of a personal cloud maintains a copy of the synchronized data. Alternatively, the data synchronizer 306 may perform asymmetric replication, wherein data of the personal cloud device 300 may be replicated to a specific data server of the personal cloud. The data server may be provided by the gateway device 106, for example, or alternatively, the data server may be another device in the personal cloud.

The data synchronizer 306 is able to detect changes to data at the personal cloud device 300. In the symmetric replication context, in response to detecting a data change, the data synchronizer 306 may update the data of each other personal cloud device in the personal cloud. In the asymmetric replication context, in response to detecting a data change, the data synchronizer 306 may update data at the data server in the personal cloud.

Although the personal cloud device 300 is described as having a data synchronizer 306 to synchronize data of the personal cloud device 300 with other personal cloud devices or a data server of a personal cloud, data replication may not be performed in the personal cloud. Without data replication, each personal cloud device of the personal cloud maintains a respective subset of data, which may be different from data residing on another personal cloud device of the personal cloud. The respective subset of data at each personal cloud device may be shared with any other personal cloud device in a personal cloud.

A zero-replication arrangement may be utilized in a personal cloud. In such an arrangement, one of the personal cloud devices of the personal cloud may be configured as a universal computing module, which may act as a processing and storage server on behalf of other devices in the personal cloud. In such an arrangement, the other personal cloud devices of the personal cloud may include human machine interface (HMI) shells. An HMI shell may be similar to a thin terminal. An HMI shell has reduced processing and storage capabilities, and would rely upon the universal computing module for general processing and computing functions, and for data storage. Note that the HMI shell would not persistently store data, as that would be performed at the universal computing module. The HMI shells may be utilized to view the data, to set sharing rules associated with the data, and to view data retrieved from a remote personal cloud.

When the personal cloud device 300 is configured as the gateway device 106 of FIG. 2, the personal cloud device 300 may also include gateway device modules 308, which may include the authentication client 204, inbound agent 206, and outbound agent 208, for example.

The user interface module 302, data manager 304, data synchronizer 306, and gateway device modules 308 may be implemented as machine-readable instructions that are executable on a processor or processors 310. A processor may include a microprocessor, microcontroller, processor module or subsystem, programmable integrated circuit, programmable gate array, or another control or computing device.

The processor 310 may be coupled over an interconnect bus 312, which may include one or more buses, with various other components, including various storage media. The various storage media may include random access memory (RAM) 314, which may be dynamic RAM or static RAM, non-volatile memory 316, which may be flash memory, electrically erasable and programmable read-only memory, or face change memory, and a secondary storage 318, such as disk-based storage devices such as an optical disk storage device or a magnetic disk storage device, and so forth.

A network interface 320 may also be coupled to the interconnect bus 312. The network interface 320 may provide a wired network interface to allow the personal cloud device 300 to communicate over a wired network, or a wireless network interface to allow the personal cloud device 300 to communicate over a wireless network, such as a WiFi link, a Bluetooth link, a cellular wireless link, and so forth. The network interface 320 may be both a wired and wireless network interface.

In addition, the personal cloud device 300 has a video adapter 322 that is coupled to the interconnect bus 312. The video adapter is connected to a display device 324, which may display various data, including the user interface provided by the user interface module 302.

Figure 4:
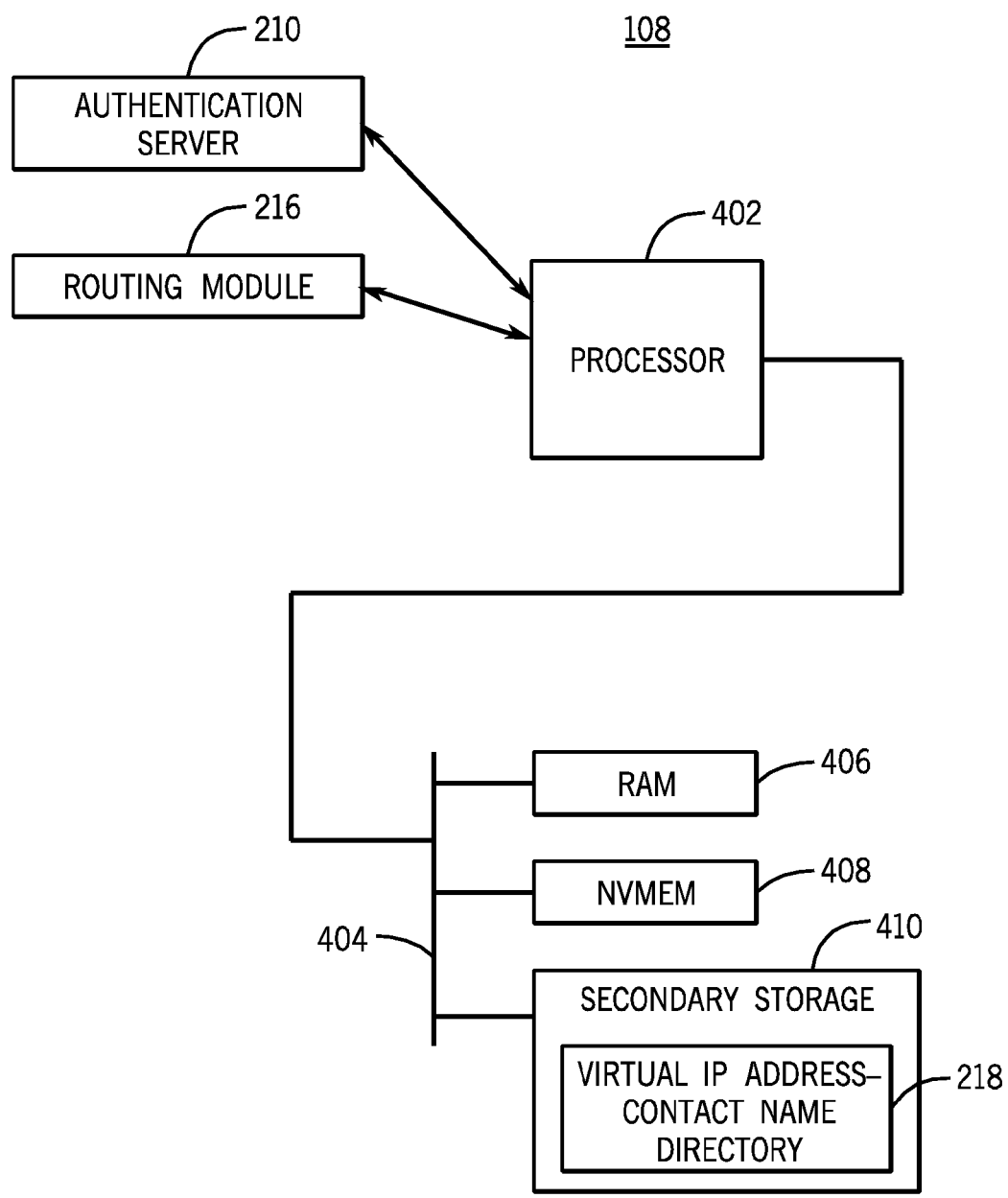
FIG. 4 is a block diagram of a personal cloud interconnect system in accordance with the disclosure.

FIG. 4 depicts an example of a personal cloud interconnect system 108. The personal cloud interconnect system 108 includes the authentication server 210 and the routing module 216, which may be implemented as machine-readable instructions that are executable on one or multiple processors 402. The processor(s) 402 may be connected to an interconnect bus 404, which may further be connected to an RAM 406, a non-volatile memory 408, and a secondary storage 410. The virtual IP address-contact name directory 218 may be stored in the secondary storage 410. The virtual IP address-contact name directory 218 may at least be partially stored in the RAM 406.

Figure 5:
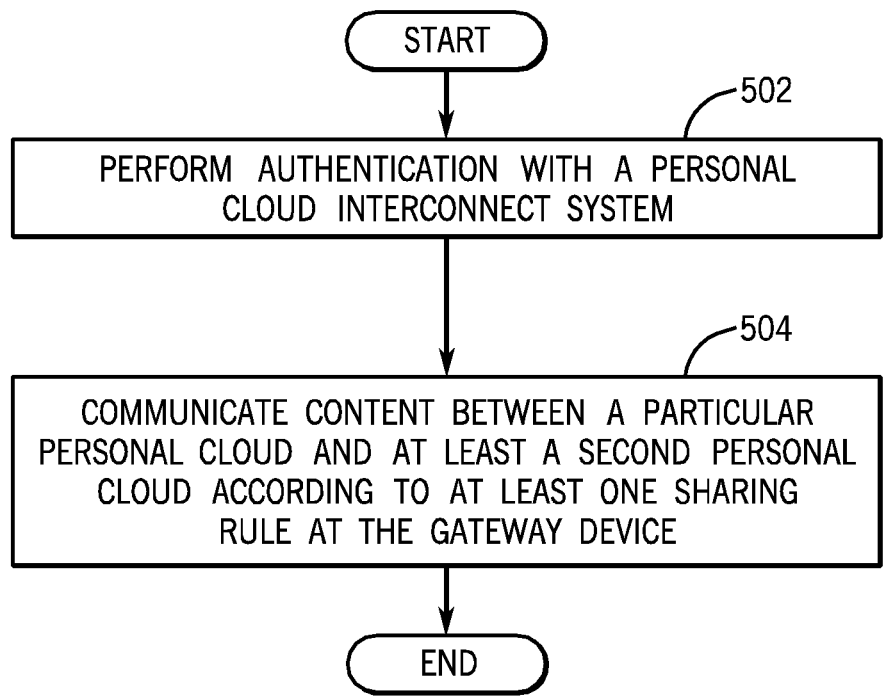
FIG. 5 is a flow diagram of a method performed by a gateway device in accordance with the disclosure.
Figure 6:
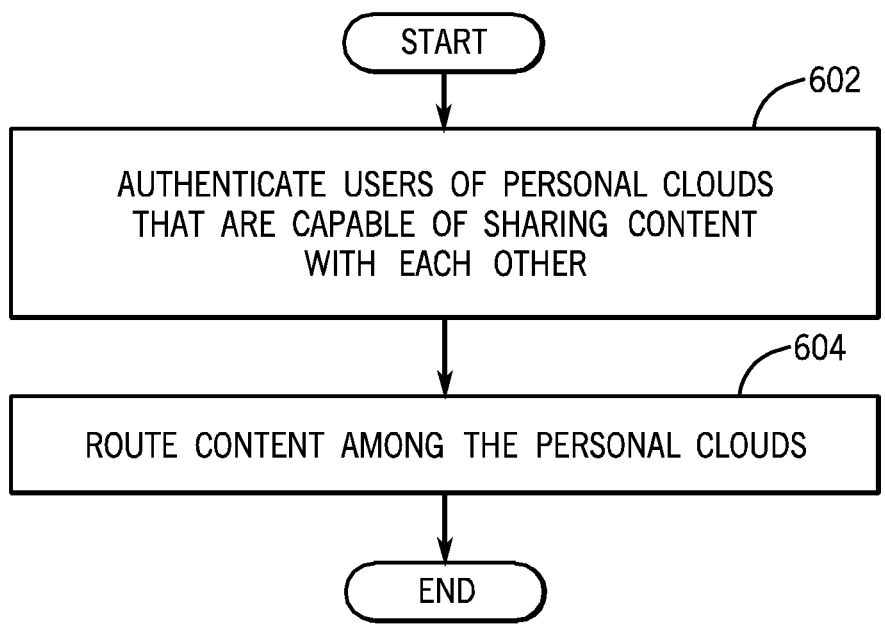
FIG. 6 is a flow diagram of a method performed by a personal cloud interconnect system in accordance with the disclosure.

Flowcharts illustrating various methods are shown in FIG. 5 and FIG. 6. A method may be carried out by software executed, for example, by the processor 310 or 402. Coding of software for carrying out a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, device, or apparatus, which may be a non-transitory or tangible storage medium. FIG. 5 is an example of a flow diagram of a method performed by a gateway device 106. The gateway device performs 502 authentication with the personal cloud interconnect system 108 that coordinates routing of data among multiple personal clouds. The gateway device is part of a personal cloud.

The gateway device further communicates 504 data between the personal cloud and at least a second of the plurality of personal clouds. The communication of data is according to sharing rules 212 including criteria relating to data to be shared among the plurality of personal clouds.

FIG. 6 is a flow diagram of a method performed by the personal cloud interconnect system 108. The method may include the authentication server 210 authenticating 602 users of personal clouds that are configured to share data with each other. The authenticating is based on interaction between the authentication server 210 and the gateway devices 106 of the personal clouds.

In addition, the routing module 216 of the personal cloud interconnect system 108 may route 604 data among personal clouds. Communication among the personal clouds is according to sharing rules provided at respective gateway devices in the corresponding personal clouds. As noted above, the routing of data may involve a communication in which the data is passed through the personal cloud interconnect system 108, or alternatively, a communication in which the personal cloud interconnect system 108 provides information to the source personal cloud to allow a communication to be established with destination personal cloud(s).

In the foregoing description, numerous details are set forth to provide an understanding of the subject disclosed herein. Implementations may be practiced without some or all of these details. Other implementations may include modifications and variations from the details discussed above. The appended claims cover such modifications and variations.

What is claimed is:

1. A method comprising:
providing authentication information, by a gateway device, to an interconnect system that coordinates communication of data among a plurality of personal clouds, wherein a personal cloud includes a plurality of electronic devices that are associated with a user, wherein the plurality of electronic devices in the personal cloud communicate with each other via a peer-to-peer networking protocol, wherein the gateway device is part of a first personal cloud, and wherein the interconnect system includes an authentication server configured to authenticate the plurality of personal clouds;
authenticating the plurality of personal clouds by the authentication server, the authentication server authenticating the first personal cloud based on the authentication information provided by the gateway device of the first personal cloud; and
in response to authenticating the plurality of personal clouds, communicating data between the first personal cloud and at least a second personal cloud based on information in the interconnect system, wherein the communication is performed according to at least one rule provided at the gateway device, wherein the at least one rule includes at least one criterion relating to data to be shared among the plurality of personal clouds, and wherein communicating the data comprises pulling the data from at least the second personal cloud according to the at least one rule.

2. The method of claim 1, wherein communicating the data comprises securely tunneling the data among the personal clouds through a network.

3. The method of claim 1, wherein communicating the data comprises pushing the data to at least the second personal cloud according to the at least one rule.

4. The method of claim 1, wherein communicating the data comprises accepting a pull attempt from at least the second personal cloud according to the at least one rule.

5. The method of claim 1, wherein communicating the data comprises accepting a push attempt from at least the second personal cloud according to the at least one rule.

6. The method of claim 1, wherein communicating the data comprises communicating the data through the interconnect system.

7. The method of claim 6, wherein the interconnect system does not process the communicated data.

8. The method of claim 1, further comprising storing data to be shared between personal clouds at a storage device accessible by the interconnect system.

9. The method of claim 1, wherein electronic devices and the gateway device of the first personal cloud are part of an arrangement in which the electronic devices include human machine interface shells.

10. The method of claim 1, wherein the communication of data is in a distributed data sharing arrangement wherein data is served from the personal clouds.

11. The method of claim 1, wherein the communication of data comprises communicating measurement information of a sensor in the first personal cloud.

12. The method of claim 1, wherein data located at each electronic device in the personal cloud is shared among the plurality of electronic devices in the personal cloud.

13. The method of claim 1, wherein the personal cloud includes a sensor that is separate from the plurality of electronic devices that are associated with the user, wherein the sensor communicates with at least one electronic device among the plurality of electronic devices.

14. A computer-readable storage device having computer-readable code executable by at least one processor of a gateway device to at least:
provide authentication information to an interconnect system that coordinates communication of data among a plurality of personal clouds, wherein a personal cloud includes a plurality of electronic devices that are associated with a user, wherein the plurality of electronic devices in the personal cloud communicate with each other via a peer-to-peer networking protocol, wherein the gateway device is part of a first personal cloud, and wherein the interconnect system includes an authentication server configured to authenticate the plurality of personal clouds;
receiving an indication of authentication of the plurality of personal clouds by the authentication server, the authentication server authenticating the first personal cloud based on the authentication information provided by the gateway device of the first personal cloud; and
in response to receiving the indication of authentication of the plurality of personal clouds, communicate data between the first personal cloud and at least a second personal cloud based on information in the interconnect system, wherein the communication is performed according to at least one rule provided at the gateway device, wherein the at least one rule includes at least one criterion relating to data to be shared among the plurality of personal clouds, and wherein communicating the data comprises pulling the data from at least the second personal cloud according to the at least one rule.

15. A system comprising:
an authentication server configured to authenticate personal clouds that are configured to share data, wherein a personal cloud includes a plurality of electronic devices that are associated with a user, wherein the plurality of electronic devices in the personal cloud communicate with each other via a peer-to-peer networking protocol, wherein the authentication server authenticates a first personal cloud based on authentication information provided by a gateway device of the first personal cloud; and
at least one processor configured to route data among the personal clouds according to rules provided at gateway devices in the personal clouds in response to the authentication server authenticating the personal clouds, wherein routing the data comprises pulling the data from at least one authenticated personal cloud according to the rules.

16. The system of claim 15, wherein system does not process the data.

17. The system of claim 15, further configured to support data sharing that includes communication of the data that is stored in a distributed manner at personal cloud devices in the personal clouds.

18. The system of claim 15, further configured to support social networking interaction that includes communication of the data that is stored in a distributed manner at personal cloud devices in the personal clouds.

19. The system of claim 15, further comprising a storage system configured to store a data structure that maps contact names to corresponding network addresses, wherein data packets are routed among the personal clouds with the network addresses.

* * * * *